United States Patent [19]

Krohn et al.

[11] 4,163,654

[45] Aug. 7, 1979

[54] METHOD OF MANUFACTURING GRADED INDEX OPTICAL FIBERS

[75] Inventors: David A. Krohn, Hamden; Seymour Merrin, Fairfield, both of Conn.

[73] Assignee: Exxon Research & Engineering Co., Florham Park, N.J.

[21] Appl. No.: 898,838

[22] Filed: Apr. 21, 1978

[51] Int. Cl.² ............................................. C03D 37/00
[52] U.S. Cl. ............................................ 65/3 A; 65/2; 65/13; 65/DIG. 7
[58] Field of Search ............ 65/1, 2, 3 A, 13, DIG. 7

[56] References Cited

U.S. PATENT DOCUMENTS 4,061,484  12/1977  Aulich et al. .................... 65/13 X

FOREIGN PATENT DOCUMENTS 1340849  12/1973  United Kingdom .................... 65/3 A

*Primary Examiner*—Robert L. Lindsay, Jr.

[57] ABSTRACT

A process is disclosed for making an optical fiber having a graded index glass core enveloped by a cladding material. The ingredients from which the peripheral part of the core glass is to be formed are placed in a closed tube of the cladding material which is more refractory than the core glass. The ingredients are melted to form a glassy liquid which is fined within the tube and then coated (for example, by rotational casting) on the inner surface of the tube. Additional ingredients, from which the inner part of the core glass is to be formed, are then placed in the coated tube, melted and similarly coated on the inner surface of the tube. In this way successive core glass layers, each having a different index of refraction, may be formed within the tube of cladding material. The temperature is then elevated further and the tube and glassy liquid drawn into a fiber.

1 Claim, 3 Drawing Figures

FIG. 1A  FIG. 1B  FIG. 1C
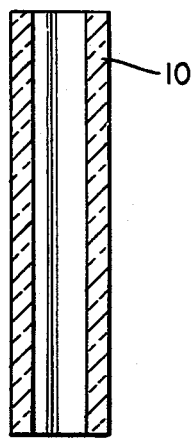
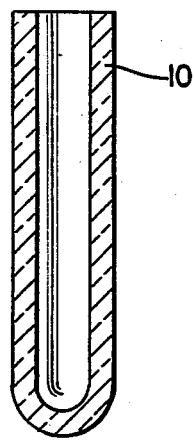
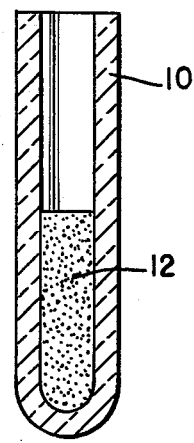
FIG. 1D  FIG. 1E
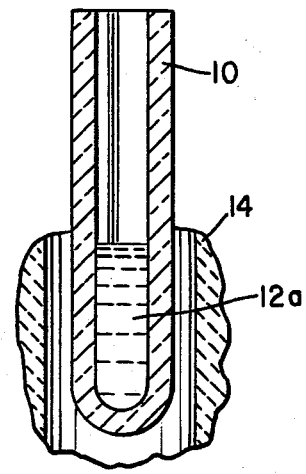
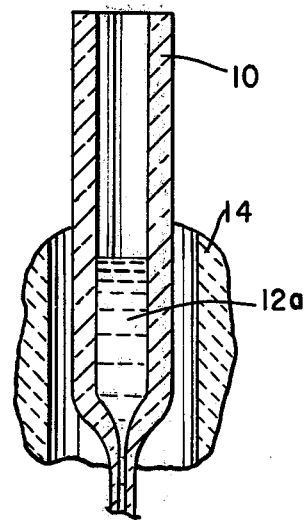
FIG. 2
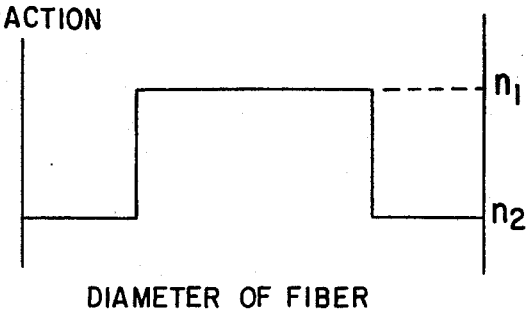

METHOD OF MANUFACTURING GRADED INDEX OPTICAL FIBERS

BACKGROUND OF THE INVENTION

This invention relates to optical fibers and, more particularly, to a method capable of manufacturing low loss optical fibers having a core in which the index of refraction increases towards the center.

Optical fibers (or optical waveguides as they are sometimes called) should have minimum transmission losses and, in many applications, the ability to gather or accept light from the widest possible angle. These properties enable the maximum transfer of energy by the fiber from a light source to an output device.

Known optical fibers comprise a glass core enveloped by a glass cladding layer having an index of refraction ($n_2$) less than the index of refraction of the core material ($n_1$). Simply stated, the difference between these indices causes light rays entering the fiber within a specified angle to be reflected internally and thereby transmitted through the fiber. The "cone" of light which can be accepted by a fiber is known as the angle of acceptance and the sine of this angle is referred to as the numerical aperture (NA) of the fiber. For any fiber:

$$NA = (n_1^2 - n_2^2)^{\frac{1}{2}}$$

The higher the numerical aperture, the greater the ability of the fiber to gather light. For numerical aperture equal to one, the angle of acceptance is 90° which means that all of the light striking the face of the fiber will be coupled into it.

Increasing the numerical aperture, while enhancing light gathering efficiency, introduces problems of dispersion because rays entering at grazing angles will travel longer paths than rays which are perpendicular to the face of the fiber. This means that different parts of a light pulse (for example) will traverse the fiber with different traversal times. As a result, the light pulse at the fiber output will be dispersed or broadened and this limits the data carrying capacity of the fiber.

To overcome this problem, the refractive index of the core may be graded so that it increases (e.g., parabolically) from the circumference to the center of the core. This will cause the light to travel a sinusoidal path, with the speed of the light increasing toward the periphery where the index is lower. Hence, light traveling the longer peripheral paths will travel at higher speeds thereby compensating for the added distance and decreasing the dispersion of the input pulse.

Techniques for making graded index fibers are described in U.S. Pat. Nos. 4,053,204 and 4,053,204 assigned to Bell Telephone Laboratories.

The causes for loss in a fiber are material absorption, material scattering, cladding loss and geometry loss. Material absorption losses occur because of transition metal ions and OH groups in the glass that absorb light [e.g. 1 part per million iron will result in a loss of 100 db per km at 800 nm (nanometers)]. Materials scattering is due to imperfections in the fiber core, primarily bubbles, microcracks and debris. Cladding loss exists because of imperfections at the core-cladding interface. Geometry loss is due to bends in the fiber and is an inverse function of numerical aperture. A low loss fiber should have losses no greater than 150 db per km.

Typically, the cladding material of an optical fiber is fused silica ($SiO_2$) of high purity although other glasses such as borosilicates are also used. The core may be a silica glass to which modifiers are added to increase the index of refraction (and the numerical aperture). Suitable modifiers for this purpose include lead oxide (PbO) barium oxide (BaO) and germanium dioxide ($GeO_2$). These modifiers, in turn, may cause problems of glass stability, and agents such as calcium, zinc, or alumina may be added as stabilizing agents. To facilitate melting of the glass (for drawing), fluxing agents such as the oxides of the alkali metals (potassium, sodium and lithium) may also be added.

The introduction of these various agents or components into the core glass creates problems insofar as contamination and, therefore, material absorption losses are concerned. The various components themselves may be sources of contaminants but, equally important, the procedure by which a multi-component glass is made can add contaminants which cause substantial material absorption losses.

THE PRIOR ART

Various techniques are used to make optical fibers. In the simplest procedure, a rod of core material is placed within a tube of cladding material, the temperature raised, and the rod and tube drawn to the desired cross-sectional area (see U.S. Pat. No. 3,659,915). Fibers manufactured by this process cannot be used in some cases (e.g. for communications) because of excessive losses and dispersion.

The most important processes for making low loss fiber optics are known as the double crucible process, the chemical vapor deposition process and the ion leaching process.

In the double crucible process a platinum or ceramic outer crucible contains the cladding glass. Inside the outer crucible is another platinum or ceramic crucible in which the core glass is melted. A fiber is drawn by pulling the core glass inside of the cladding glass. The process is capable of producing glasses with high numerical aperture; however, it is limited to moderate loss because of geometric inconsistencies associated with drawing glasses which are in a very fluid state and also because the ceramic or platinum crucibles cause contamination of the glass materials.

In the chemical vapor deposition process, pure chemicals (for example, silica tetrachloride, germanium tetrachloride and boron chloride) are passed into a manifold with oxygen. They are then mixed and fed into a rotating high purity fused silica tube in which flame traverses the tube while it is rotating. The result is that the silica is oxidized and deposited on the inside of the high purity fused silica tube. The deposit is doped with germanium dioxide and the tube is then collapsed and drawn. The composition can be readily controlled and it is possible to get good gradients in composition and therefore good gradients in refractive index. The process has associated with it limited pre-form size, which inhibits large scale production, and core defects may arise when the tube is collapsed.

In the ion leaching process, a borosilicate glass rod is heat treated. During the heat treatment the glass phase separates and the impurities migrate to the second phase. The glass is then acid leached and the second phase along with the impurities removed from the core glass yielding a high purity microporous silica glass. A high purity dopant (for example, cesium) is introduced and the surface washed so that the surface is dopant free while the interior still contains the dopant. Then the micro-pores are collapsed at high temperature to form a preform and the fiber is drawn. This process yields low or moderate numerical aperture and moderate loss although the process may be able to yield low loss. Grading the fiber by this process would be difficult. Also, there are many steps involved and in many of the early steps the preform is unstable due to mechanical weakness so that yield can be a problem.

OBJECTS OF THE INVENTION

The main object of this invention is to provide a method for making optical fibers in which the core has a graded refractive index such as to minimize dispersion.

DESCRIPTION OF THE DRAWINGS

FIGS. 1A through 1E show diagrammatically the steps of a process with which the process of the invention may be practiced;

FIG. 2 shows the index of refraction across the fiber produced by the process of FIGS. 1A-1E;

SUMMARY OF THE INENTION

Figure 3A:
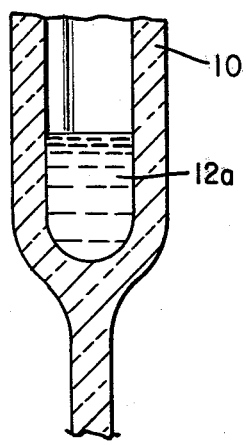
FIGS. 3A through 3E show diagrammatically the steps of a preferred embodiment of the invention for making a graded index fiber.

In accordance with the invention, the core glass of an optical fiber is formed by melting and fining the material from which the peripheral part of the core glass is to be made within a closed tube made of the cladding material. The tube of cladding material has a higher melting temperature than the core glass and serves as a crucible for the core glass during melting and fining. The molten core glass is then coated on the inner wall of the cladding tube. Additional material from which a core glass of higher refractive index can be formed may be added to the coated tube, melted and coated on the inner wall in the same way to build a core consisting of discrete annular layers of glass having progressively higher indices of refraction toward the center. The tube and core glass are then elevated to drawing temperature and drawn into the optical fiber.

DETAILED DESCRIPTION

The invention is particularly adapted for use with the process disclosed and claimed in U.S. patent application Ser. No. 898,840, filed on Apr. 21, 1978 in the name of David A. Krohn and entitled "Method of Manufacturing Optical Fibers". The process of that application is diagramatically represented in FIGS. 1A through 1E.

In describing the invention, reference will be made to the use of a batch material for forming a multi-component core glass; however, as explained below, the process of the invention may start with a pure cullet.

As used herein, the term "batch material" means an ingredient used to form glass. In most cases these ingredients (or glass components) are oxides which are mechanically mixed and melted. Upon cooling, the glass is formed. Commonly, these ingredients are referred to as glass formers, glass modifiers and fluxes. In some cases, a batch material may be pre-reacted, for example, by heating to facilitate outgassing. Glass may include one or several of these components depending on the properties desired. In the case of optical fibers, the principal properties of concern (besides purity) are index of refraction, viscosity, thermal expansion and stability.

According to the inventio, a tube 10 made of the cladding material is closed at its lower end as shown in FIG. 1B. A commercially available, high purity, fused silica tube may be used as tube 10. The components which are to form the multicomponent core glass are next introduced into tube 10 as batch material 12 (FIG. 3). For example, batch material 12 may comprise $SiO_2$ (68% by weight), BaO (22%), and $K_2O$ (10%). Batch material 12 can (and should) be of high purity and substantially less refractory than the tube 10 so that tube 10 can serve as a crucible in which the batch material can be melted. Heat is then applied by a furnace 14 (FIG. 10) or other heating device to melt the batch material 12 and form a glassy liquid 12A within the tube 10.

The glassy liquid 12A is then fined, i.e., heat treated sufficiently to make it homogeneous and bubble free. The tube 10 must be sufficiently refractory to serve as a crucible during the fining step which is an important part of the process if a low loss core glass is desired.

For production purposes, resistance heating, induction heating and/or laser heating devices (for example) can be used as furnace 14.

In the final step (FIG. 1E), the temperature is further elevated until the fused silica tube 10 softens and a fiber can be drawn. The resultant fiber will have low loss and a numerical aperture defined by the selected batch materials. As shown in FIG. 2, the refractive index will be stepped, that is, the core will have one refractive index ($n_1$) and the cladding another ($n_2$), with a discontinuity at the interface.

Examples of various different batch materials which have been used to make optical fibers in accordance with the process of FIGS. 1A-1E are given in the aforesaid Krohn application Ser. No. 898,840.

Instead of forming the core glass from batch material 12 within tube 10, previously melted ultra-pure glass which is in powder or granular form (hereinafter referred to as "cullet") may be used as a raw material. To obtain a highly purified cullet suitable for use in manufacturing a low loss fiber, the glassy liquid 12A within tube 10 may be quenched in ultra-pure deionized water (for example). This will cause the glass to solidify in the form of a granular or powder-like cullet. The cullet may then be stored (under ultra-clean conditions) until it is to be used, at which time the cullet is melted and fined within a tube 10 as described. The advantage in using a cullet is that the two melting steps may provide better out-gassing, thus yielding less bubbles and better homogeneity.

Other techniques may also be used to provide a suitable cullet. For example, in a "skull" melting technique, a "skull" of pure glass is first coated on a container. The pure glassy liquid from which the cullet is to be formed is then melted in the skull and the cullet formed by quenching the glassy liquid.

The process of FIGS. 1A-1E provides a number of important advantages over the various processes which are currently used to make optical fibers. Only the chemical vapor deposition and ion leaching processes provide comparably pure core glass (and thus low loss) and in both of those processes, the cores must be collapsed in drawing. This introduces defects into the core and, thus, causes scattering losses. As currently practices, the chemical vapor deposition process is unable to provide fibers with high numerical apertures and both processes are more complicated and costly than the invention. The double crucible, without strict composition limitations, and rod and tube processes are unable to produce low loss fibers because of the contamination which must inevitably occur when the core glass is produced in even the cleanest of platinum or ceramic crucibles.

A further advantage of the process of FIGS. 1A–1E arises from the prolonged contact of the molten core glass with the surface of the cladding material. This causes additional refinement of the core-cladding interface which helps to get rid of bubbles and other defects trapped at the interface, thereby reducing scattering losses.

The process of FIGS. 1A–1E can be used with cladding tubes having different wall thicknesses to control the core-cladding ratio. As is known, a very low core-cladding ratio will result in a single mode fiber and such fibers can be made by the process of FIGS. 1A–1E.

As mentioned above, in the case of a stepped index fiber (as represented in FIG. 2), the dispersion of light is a limiting factor in communications. This problem is overcome or at least minimized by grading the refractive index of the core so that it increases from the periphery to the center.

Figure 3B:
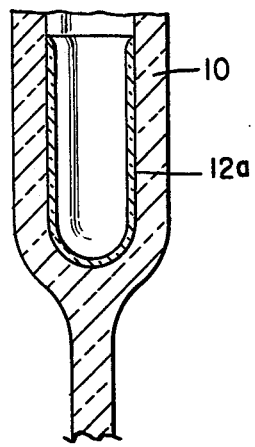
Figure 3C:
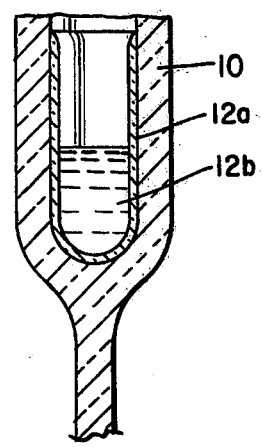
Figure 3D:
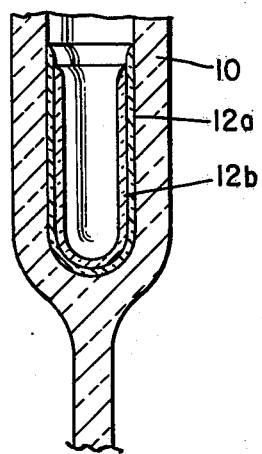
Figure 3E:
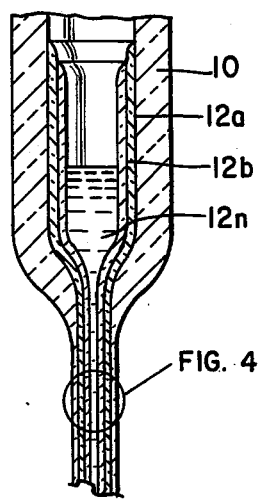

The process of this invention enables close control of the core index of refraction and is shown diagrammatically in FIGS. 3A–3E. Batch material (or cullet) 12a having a relatively low index of refraction is inserted in silica tube 10 and melted as described above (FIG. 3A). The tube 10 is then rapidly rotated so as to cast a thin layer of glass 12a on the interior surface of tube 10 (FIG. 3B). Additional batch material 12b having a higher refractive index is then added, melted, and rotationally cast to form a second core layer as shown in FIGS. 3C and 3D. Successive layers may be similarly formed until the center core glass 12n is added (FIG. 3E) to thereby build a graded index core comprising a plurality of concentric cylinders when the fiber is drawn. Of course, any number of discrete layers may be applied to form the core.

Figure 4:
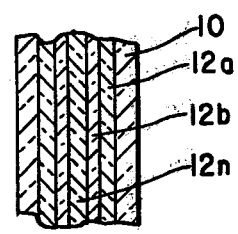
FIG. 4 is a cross-sectional view of a fiber formed by the process of FIGS. 3A-3E.
Figure 5:
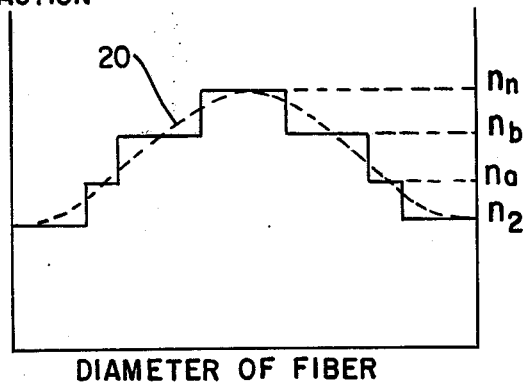
FIG. 5 shows the index of refraction across the fiber produced by the process of FIGS. 3A-3E.

FIG. 4 shows the cross section of a fiber formed by the process of FIGS. 3A–3E. The core glass comprises discrete layers 12a and 12b with a central core 12n. Each has a progressively higher index of refraction $n_a$, $n_b$ and $n_n$ as represented in FIG. 5, thereby providing a graded index of refraction for the entire core 12. Preferably, to minimize dispersion, the curve 20 defined by the refractive indices of the discrete layers (FIG. 5) should approximate a parabola.

Subsequent heat treatment of the drawn fiber may help to grade uniformly the fiber. Such heat treatment will cause a blending of the various layers at the interfaces which would yield a smoother curve (as shown by curve 20 in FIG. 5) instead of a series of steps.

What is claimed is:

1. A process for making a graded index optical fiber, comprising the steps of:

introducing the batch material for a first core glass into a closed tube of fused silica having a refractive index less than that of the first core glass;

melting said batch material to form a glassy liquid within the said tube;

rotationally casting a layer of said glassy liquid on the inner wall of said tube;

introducing the batch material for a second core glass into said coated tube, the refractive index of said second core glass being greater than that of said first core glass;

melting the batch material for said second core glass to form a glassy liquid within said coated tube; and drawing said tube and said first and second glassy liquids into said optical fiber.

* * * * *